United States Patent
Huang et al.

(10) Patent No.: US 10,970,309 B2
(45) Date of Patent: Apr. 6, 2021

(54) DATA STORAGE METHOD AND APPARATUS

(71) Applicant: ADVANCED NEW TECHNOLOGIES CO., LTD., Grand Cayman (KY)

(72) Inventors: Wenhua Huang, Hangzhou (CN); Shuai Wang, Hangzhou (CN); Jiaying Zhou, Hangzhou (CN); Wenlong Lian, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/884,444

(22) Filed: May 27, 2020

(65) Prior Publication Data

US 2020/0285654 A1    Sep. 10, 2020

Related U.S. Application Data

(63) Continuation of application No. PCT/CN2020/071271, filed on Jan. 10, 2020.

(30) Foreign Application Priority Data

Jun. 5, 2019  (CN) .......................... 201910487832.3

(51) Int. Cl.
   *G06F 16/27*     (2019.01)
   *G06F 16/22*     (2019.01)
   (Continued)

(52) U.S. Cl.
   CPC .............. *G06F 16/27* (2019.01); *G06F 16/22* (2019.01); *G06F 16/258* (2019.01);
   (Continued)

(58) Field of Classification Search
   CPC .......... G06F 16/23; G06F 16/24; G06F 16/903
   See application file for complete search history.

(56) References Cited

U.S. PATENT DOCUMENTS 9,165,002 B1 *  10/2015  Lazier ................... G06F 16/162
10,768,817 B2 *  9/2020  Kesavan ............... G06F 3/0665
(Continued)

FOREIGN PATENT DOCUMENTS

CN     104468737 A     3/2015
CN     107566505 A     1/2018
(Continued)

OTHER PUBLICATIONS

First Search dated Apr. 21, 2020, issued in related Chinese Application No. 201910487832.3 (1 page).
(Continued)

*Primary Examiner* — William Spieler

(57) ABSTRACT

A method includes: setting at least two service domains each having a service domain identifier; configuring, based on parameter information of each of the at least two service domains, at least two storage resources corresponding to the at least two service domains; receiving a data storage request including to-be-stored data and a service domain identifier for the to-be-stored data; determining, according to the service domain identifier of the to-be-stored data, a target storage resource corresponding to the to-be-stored data from the at least two storage resources; storing the to-be-stored data to the target storage resource; receiving a data reading request carrying the service domain identifier; in response to receiving the data reading request, reading, based on the service domain identifier, the data stored at the target storage resource; and transmitting the data read from the target storage resource to a requester that sends the data reading request.

20 Claims, 7 Drawing Sheets

(51) Int. Cl.
  *H04L 12/24* (2006.01)
  *H04L 29/08* (2006.01)
  *G06F 16/25* (2019.01)

(52) U.S. Cl.
  CPC ...... *H04L 41/0806* (2013.01); *H04L 41/5003* (2013.01); *H04L 67/1097* (2013.01)

(56) References Cited

U.S. PATENT DOCUMENTS

| | | |
|---|---|---|
| 2002/0068545 A1 | 6/2002 | Oyama et al. |
| 2005/0278493 A1* | 12/2005 | Lin ................... G06F 11/1458 711/162 |
| 2008/0126404 A1 | 5/2008 | Silk et al. |
| 2008/0235379 A1 | 9/2008 | Monette |
| 2011/0268047 A1 | 11/2011 | Nath et al. |
| 2013/0103807 A1 | 4/2013 | Couto et al. |
| 2013/0128777 A1 | 5/2013 | Azorero |
| 2014/0280382 A1 | 9/2014 | Gabay et al. |
| 2014/0289205 A1* | 9/2014 | Shigeta ............. H04L 47/2475 707/660 |
| 2015/0025929 A1* | 1/2015 | Abboud ......... G06Q 10/063114 705/7.15 |
| 2017/0006528 A1 | 1/2017 | Bari |
| 2017/0031600 A1* | 2/2017 | Kesavan ............... G06F 3/0665 |
| 2017/0105189 A1 | 4/2017 | Foti |
| 2017/0230467 A1 | 8/2017 | Salgueiro et al. |
| 2017/0238279 A1 | 8/2017 | Jeong et al. |
| 2018/0026893 A1 | 1/2018 | Jeuk et al. |
| 2018/0077012 A1 | 3/2018 | Tellado et al. |
| 2018/0091506 A1 | 3/2018 | Chow et al. |
| 2018/0300060 A1* | 10/2018 | Kesavan ................ G06F 3/067 |
| 2019/0034102 A1* | 1/2019 | Miller .................. G06F 3/0647 |
| 2020/0363959 A1* | 11/2020 | Kesavan ............... G06F 3/0665 |

FOREIGN PATENT DOCUMENTS

| | | |
|---|---|---|
| CN | 107766343 A | 3/2018 |
| CN | 108681578 A | 10/2018 |
| CN | 109325200 A | 2/2019 |
| CN | 109542961 A | 3/2019 |
| CN | 110347675 A | 10/2019 |

OTHER PUBLICATIONS

First Office Action dated Apr. 27, 2020, issued in related Chinese Application No. 201910487832.3, with English machine translation (11 pages).

International Search Report and Written Opinion of the International Searching Authority for International Application No. PCT/CN2020/071271, made available to the public on Dec. 10, 2020 with partial machine English translation, 10 pages.

* cited by examiner

DATA STORAGE METHOD AND APPARATUS

CROSS REFERENCE TO RELATED APPLICATIONS

This application is a continuation application of International Application No. PCT/CN2020/071271, filed on Jan. 10, 2020, which claims priority to and benefits of Chinese Patent Application No. 201910487832.3 filed on Jun. 5, 2019. The contents of the above-referenced applications are incorporated herein by reference in their entirety.

TECHNICAL FIELD

The specification relates to the field of computer technologies, and more particularly to a data storage method and apparatus, a computing device, and a storage medium.

BACKGROUND

In a computer system, the use of a data storage system is generally required. With the rapid development of network applications, requirements such as large number of accesses, large volumes of data, and high concurrent availability are imposed on data storage. To cope with the sudden increase in the number of accesses, the scale of the data storage system needs to be expanded and the data storage mode needs to be changed.

Currently, in traditional applications, a system usually provides services for multiple service lines, and data of all service lines is stored in the same database. However, for conventional data storage methods, jitters of the database affect all the services. As all the services are treated equally, services that require high performance and stability cannot be guaranteed, failing to provide personalized support, operation and maintenance. Once the services develop to a certain scale, insufficient database connection pool(s) are likely to occur, making it difficult for capacity expansion.

SUMMARY

In view of this, embodiments of the specification provide a data storage method and apparatus, a computing device, and a storage medium, to solve the technical defects in the prior art.

The embodiments of the specification disclose a data storage method, including: receiving a data storage request and acquiring to-be-stored data carrying a service domain identifier according to the data storage request; determining, according to the service domain identifier of the to-be-stored data, a target storage resource corresponding to the to-be-stored data from at least two storage resources; and storing the to-be-stored data to the target storage resource.

Further, before the receiving a data storage request and acquiring to-be-stored data carrying a service domain identifier according to the data storage request, the method further includes: setting at least two service domains and setting a service domain identifier for each of the service domains; and configuring a corresponding storage resource for each of the service domains.

Further, the configuring a corresponding storage resource for each of the service domains includes: configuring a corresponding storage resource for each of the service domains based on parameter information of the service domain.

Further, the parameter information of the service domain includes data specification information, and the configuring a corresponding storage resource for each of the service domains based on parameter information of the service domain includes: determining whether a data specification of the service domain is greater than a target specification threshold; configuring a storage resource satisfying the data specification of the service domain for the service domain in a case that the data specification of the service domain is greater than the target specification threshold; and determining a basic storage resource in the storage resources as the storage resource corresponding to the service domain in a case that the data specification of the service domain is less than or equal to the target specification threshold.

Further, the parameter information of the service domain includes operation and maintenance requirement information, and the configuring a corresponding storage resource for each of the service domains based on parameter information of the service domain includes: configuring, for the service domain based on the operation and maintenance requirement information of the service domain, a storage resource satisfying an operation and maintenance requirement of the service domain.

Further, the parameter information of the service domain includes service-level agreement (SLA) information, and the configuring a corresponding storage resource for each of the service domains based on parameter information of the service domain includes: configuring, for the service domain based on SLA information of each subservice in the service domain, a storage resource satisfying an SLA of each subservice in the service domain.

Further, the determining, according to the service domain identifier of the to-be-stored data, a target storage resource corresponding to the to-be-stored data from at least two storage resources includes: determining, according to the service domain identifier of the to-be-stored data, a service domain having the service domain identifier of the to-be-stored data as a target service domain; and determining, according to the target service domain, a storage resource corresponding to the target service domain as the target storage resource.

Further, the data storage method, further includes: receiving a data reading request carrying a service domain identifier and reading target to-be-read data.

Further, the reading target to-be-read data based on the service domain identifier includes: determining a target to-be-read service domain corresponding to the target to-be-read data based on the service domain identifier; determining a target to-be-read storage resource based on the target to-be-read service domain; and reading the target to-be-read data from the target to-be-read storage resource.

A data storage apparatus, including: a receiving module, configured to receive a data storage request and acquire to-be-stored data carrying a service domain identifier according to the data storage request; a determining module, configured to determine, according to the service domain identifier of the to-be-stored data, a target storage resource corresponding to the to-be-stored data from at least two storage resources; and a storage module, configured to store the to-be-stored data to the target storage resource.

In some embodiments, the data storage apparatus, further includes: a setting module, configured to set at least two service domains and setting a service domain identifier for each of the service domains; and a configuration module, configured to configure a corresponding storage resource for each of the service domains.

In some embodiments, the configuration module is further configured to configure a corresponding storage resource for each of the service domains based on parameter information of the service domain.

In some embodiments, the parameter information of the service domain includes data specification information, and the configuration module is further configured to: determine whether a data specification of the service domain is greater than a target specification threshold; configure a storage resource satisfying the data specification of the service domain for the service domain in a case that the data specification of the service domain is greater than the target specification threshold; and determine a basic storage resource in the storage resources as the storage resource corresponding to the service domain in a case that the data specification of the service domain is less than or equal to the target specification threshold.

In some embodiments, the parameter information of the service domain includes operation and maintenance requirement information, the configuration module is further configured to: configure, for the service domain based on the operation and maintenance requirement information of the service domain, a storage resource satisfying an operation and maintenance requirement of the service domain.

In some embodiments, the parameter information of the service domain includes service-level agreement (SLA) information, the configuration module is further configured to: configure, for the service domain based on SLA information of each subservice in the service domain, a storage resource satisfying an SLA of each subservice in the service domain.

In some embodiments, the determining module is further configured to: determine, according to the service domain identifier of the to-be-stored data, a service domain having the service domain identifier of the to-be-stored data as a target service domain; and determine, according to the target service domain, a storage resource corresponding to the target service domain as the target storage resource.

In some embodiments, the data storage apparatus, further includes: a reading module, configured to receive a data reading request carrying a service domain identifier and read target to-be-read data.

In some embodiments, the reading module is further configured to: determine a target to-be-read service domain corresponding to the target to-be-read data based on the service domain identifier; determine a target to-be-read storage resource based on the target to-be-read service domain; and read the target to-be-read data from the target to-be-read storage resource.

A computing device, including a memory, a processor, and computer instructions stored in the memory and executable by the processor, the processor executing the instructions to implement the steps of the data storage method.

A computer readable storage medium storing computer instructions, the instructions, when executed by a processor, implementing the steps of the data storage method.

The specification further provides a data storage method. The method includes: setting, by a computer, at least two service domains each having a service domain identifier; configuring, by the computer based on parameter information of each of the at least two service domains, at least two storage resources corresponding to the at least two service domains; receiving, by the computer, a data storage request including identification information for to-be-stored data; acquiring, by the computer based on the identification information for the to-be-stored data, the to-be-stored data and a service domain identifier for the to-be-stored data; determining, by the computer according to the service domain identifier of the to-be-stored data, a target storage resource corresponding to the to-be-stored data from the at least two storage resources; storing, by the computer, the to-be-stored data to the target storage resource; receiving, by the computer, a data reading request carrying the service domain identifier; in response to receiving the data reading request, reading, by the computer based on the service domain identifier, the data stored at the target storage resource; and transmitting, by the computer, the data read from the target storage resource to a requester that sends the data reading request.

In some embodiments, the parameter information of each of the at least two service domains includes a data specifications for one of the at least two service domains. The configuring, by the computer based on parameter information of each of the at least two service domains, at least two storage resources corresponding to the at least two service domains includes: determining whether the data specification for the one of the at least two service domains is greater than a specification threshold; and in response to determining that the data specification for the one of the at least two service domains is greater than the target specification threshold, configuring a storage resource satisfying the data specification for the one of the at least two service domains; or in response to determining that the data specification for the one of the at least two service domains is less than or equal to the target specification threshold, determining a basic storage resource in the storage resources as a storage resource for the one of the at least two service domains.

In some embodiments, wherein the parameter information of each of the at least two service domains includes operation and maintenance requirement information. The configuring, by the computer based on parameter information of each of the at least two service domains, at least two storage resources corresponding to the at least two service domains includes: configuring, based on the operation and maintenance requirement information of each of the at least two service domains, a storage resource satisfying the operation and maintenance requirement information for each of the at least two service domains.

In some embodiments, the parameter information of each of the at least two service domains includes service-level agreement (SLA) information. The configuring, by the computer based on parameter information of each of the at least two service domains, at least two storage resources corresponding to the at least two service domains includes: configuring, based on the SLA information of each subservice in each of the at least two service domains, a storage resource satisfying the SLA information of the each subservice in each of the at least two service domains.

In some embodiments, the determining, by the computer according to the service domain identifier of the to-be-stored data, a target storage resource corresponding to the to-be-stored data from the at least two storage resources includes: determining, according to the service domain identifier of the to-be-stored data, a service domain having the service domain identifier of the to-be-stored data as a target service domain; and determining, according to the target service domain, a storage resource corresponding to the target service domain as the target storage resource.

In some embodiments, the at least two storage resources includes: a relational database management system, a distributed storage system, a high-performance distributed database system, or a non-relational database.

In some embodiments, the method further includes formatting, by the computer, the to-be-stored data based on a format of target storage resource to store the to-be-stored data to the target storage resource.

The specification further provides an apparatus. The apparatus includes one or more processors and a memory storing instructions executable by the one or more processors to cause the one or more processors to perform operations including: setting at least two service domains each having a service domain identifier; configuring, based on parameter information of each of the at least two service domains, at least two storage resources corresponding to the at least two service domains; receiving a data storage request including identification information for to-be-stored data; acquiring, based on the identification information for the to-be-stored data, the to-be-stored data and a service domain identifier for the to-be-stored data; determining, according to the service domain identifier of the to-be-stored data, a target storage resource corresponding to the to-be-stored data from the at least two storage resources; storing the to-be-stored data to the target storage resource; receiving a data reading request carrying the service domain identifier; in response to receiving the data reading request, reading, based on the service domain identifier, the data stored at the target storage resource; and transmitting the data read from the target storage resource to a requester that sends the data reading request.

The specification further provides one or more non-transitory computer-readable storage media configured with instructions executable by one or more processors to cause the one or more processors to perform operations including: setting at least two service domains each having a service domain identifier; configuring, based on parameter information of each of the at least two service domains, at least two storage resources corresponding to the at least two service domains; receiving a data storage request including identification information for to-be-stored data; acquiring, based on the identification information for the to-be-stored data, the to-be-stored data and a service domain identifier for the to-be-stored data; determining, according to the service domain identifier of the to-be-stored data, a target storage resource corresponding to the to-be-stored data from the at least two storage resources; storing the to-be-stored data to the target storage resource; receiving a data reading request carrying the service domain identifier; in response to receiving the data reading request, reading, based on the service domain identifier, the data stored at the target storage resource; and transmitting the data read from the target storage resource to a requester that sends the data reading request.

By dividing and separating the storage resources, the data storage method and apparatus provided by the specification can improve the stability of running of various services in the system, enhance the flexibility of deployment, operation and maintenance of storage resources, and satisfy the storage requirements of various complex services.

DETAILED DESCRIPTION OF EMBODIMENTS

Many specific details are described below for a full understanding of the specification. However, the specification may be implemented in many other ways than those described herein, and those skilled in the art may make similar promotion without departing from the essence of the specification. Therefore, the specification is not limited by the specific implementation disclosed below.

The terms used in one or more embodiments of this specification are merely used to describe the embodiments but are not intended to limit one or more embodiments of this specification. The "a" and "the" in a singular form used in one or more embodiments of this specification and the appended claims are also intended to include a plural form, unless other meanings are clearly indicated in the context. It should also be understood that, the term "and/or" used in one or more embodiments of this specification indicates and includes any or all possible combinations of one or more associated listed items.

It should be understood that although the terms "first," "second," and the like may be used to describe various information in one or more embodiments of this specification, but such information should not be limited to these terms. These terms are merely used for distinguishing information of the same type from each other. For example, without departing from the scope of one or more embodiments of this specification, the first may also be referred to as the second. Similarly, the second may also be referred to as the first. Depending on the context, the term "if" as used herein may be interpreted as "when . . . " or "upon . . . " or "in response to determining."

First, terms used in one or more embodiments of the specification are explained.

Service-level agreement (SLA) is a contract between a network service provider and a customer and defines terms such as service type, service quality and customer payment. In the embodiments of the specification, the SLA information may include requirement information such as data type of to-be-stored data, access mode, and access performance.

The specification provides a data storage method and apparatus, a computing device, and a storage medium, which will be respectively described in the following embodiments.

Figure 1:
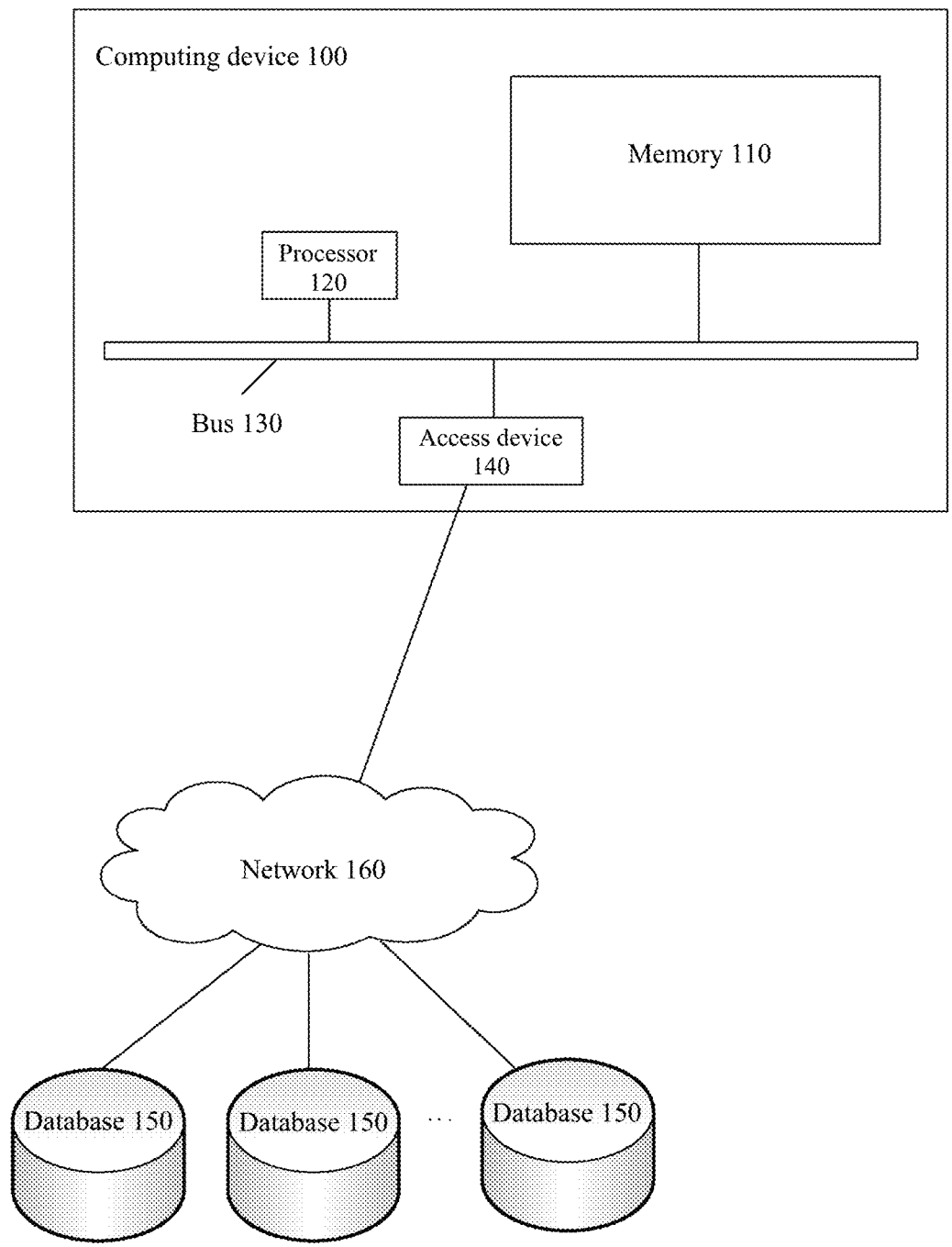
FIG. 1 is a schematic diagram of a data storage system according to an embodiment of the specification.

FIG. 1 is a schematic block diagram of a data storage system according to an embodiment of the specification. The system includes a computing device 100. Components of the computing device 100 include but are not limited to a memory 110 and a processor 120. The processor 120 is connected to the memory 110 through a bus 130. A database 150 is configured to store data.

The computing device 100 further includes an access device 140. The access device 140 enables the computing device 100 to communicate through one or more networks 160. Examples of the networks include a public switched telephone network (PSTN), a local area network (LAN), a wide area network (WAN), a personal area network (PAN), or a combination of communication networks such as the Internet. The access device 140 may include one or more of any type of wired or wireless network interface (for example, a network interface card (NIC)), such as an IEEE 802.11 wireless local area network (WLAN) wireless interface, a Worldwide Interoperability for Microwave Access (Wi-MAX) interface, an Ethernet interface, a universal serial bus (USB) interface, a cellular network interface, a Bluetooth interface, a near field communication (NFC) interface, etc.

In an embodiment of the specification, the above-mentioned components of the computing device 100 and other components not shown in FIG. 1 may also be connected to each other, for example, through a bus. It should be understood that the schematic block diagram of the computing device structure shown in FIG. 1 is only an example, rather than limiting the scope of the specification. Those skilled in the art can add or replace other components as needed.

The computing device 100 may be any type of stationary or mobile computing device, including mobile computers or mobile computing devices (for example, a tablet computer, a personal digital assistant, a laptop computer, a notebook computer, a netbook, etc.), a mobile phone (for example, a smartphone), a wearable computing device (for example, a smart watch, smart glasses, etc.) or other types of mobile devices, or stationary computing devices such as desktop computers or personal computers (PCs). The computing device 100 may also be a mobile or stationary server.

Figure 2:
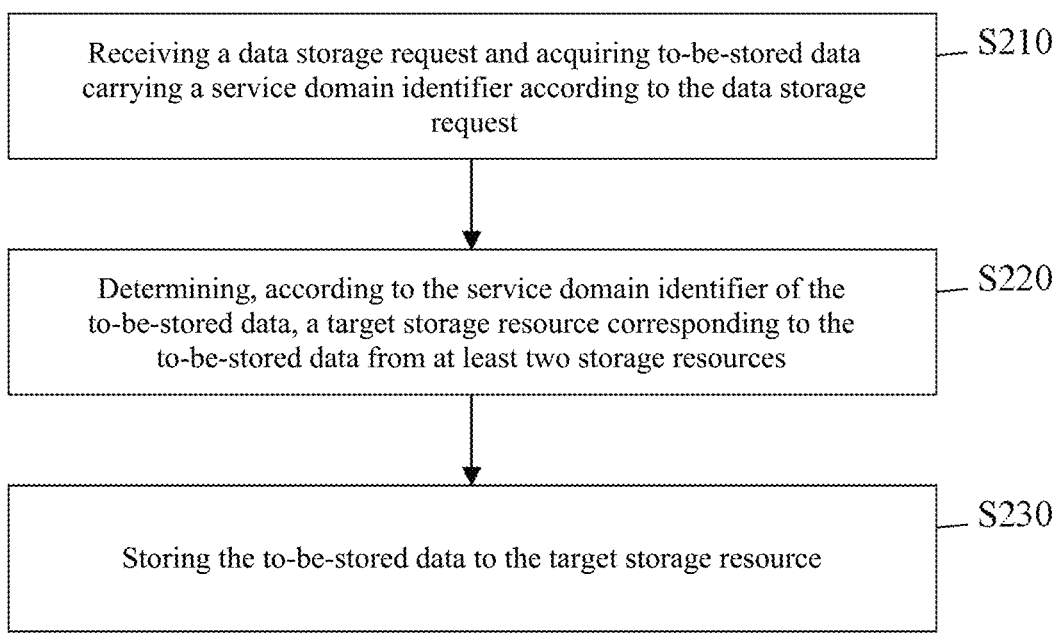
FIG. 2 is a flowchart of a data storage method according to an embodiment of the specification.

The processor 120 may perform steps in the method shown in FIG. 2. FIG. 2 is a flowchart of a data storage method according to an embodiment of the specification, The method includes step S210 to step S230.

In step S210, the method includes receiving a data storage request and acquiring to-be-stored data carrying a service domain identifier according to the data storage request.

Specifically, the data storage request may carry identification information of the to-be-stored data. The identification information of the to-be-stored data may be the type, size, or the like of the to-be-stored data, which is not limited in the specification.

The to-be-stored data carrying the service domain identifier is acquired according to the identification information of the to-be-stored data in the data storage request. The service domain identifier may be a type of tag information representing characteristics or features of a service domain. The service domain identifier carried in the to-be-stored data may represent the service domain to which the to-be-stored data belongs. The service domain may be the scope of a service. Different service lines may correspond to different service domains, and different services of the same service line belong to the same service domain. For example, "paying water bill", "paying electricity bill", "paying gas bill" and the like are different services in the same service line and belong to the same service domain, of which the service domain identifier is "living payment".

In step S220, the method includes determining, according to the service domain identifier of the to-be-stored data, a target storage resource corresponding to the to-be-stored data from at least two storage resources.

The target storage resource may be a storage resource corresponding to or matching the service domain to which the to-be-stored data belongs. The storage resource may be various databases, database servers or database systems, such as a relational database management system (MySql), a distributed storage system (HBase), a high-performance distributed database system (OceanBase) supporting massive data, or a non-relational database (NoSql), which depends on the specific situations and is not limited in the specification.

According to the service domain identifier of the to-be-stored data, a storage resource corresponding to the service domain matching the service domain identifier is found, and the storage resource is determined as the target storage resource.

In step S230, the method includes storing the to-be-stored data to the target storage resource.

Specifically, the to-be-stored data may be of various formats. Depending on actual situations, the type of storage resource used varies, and the data format matching the storage resource also varies. In a case that the format of the to-be-stored data matches the storage format of the target storage resource, the to-be-stored data may be directly stored to the target storage resource, or in a case that the format of the to-be-stored data does not match the storage format of the target storage resource, the format of the to-be-stored data may be converted before the to-be-stored data is stored, which is not limited in the specification.

In the data storage method according to an embodiment of the specification, storage resources are divided, and at least two separately isolated storage resources are set, thereby effectively improving the stability, isolation and scalability of the system and services, enhancing enhance the flexibility of deployment, operation and maintenance of storage resources, and satisfying the storage requirements of various complex services.

Figure 3:
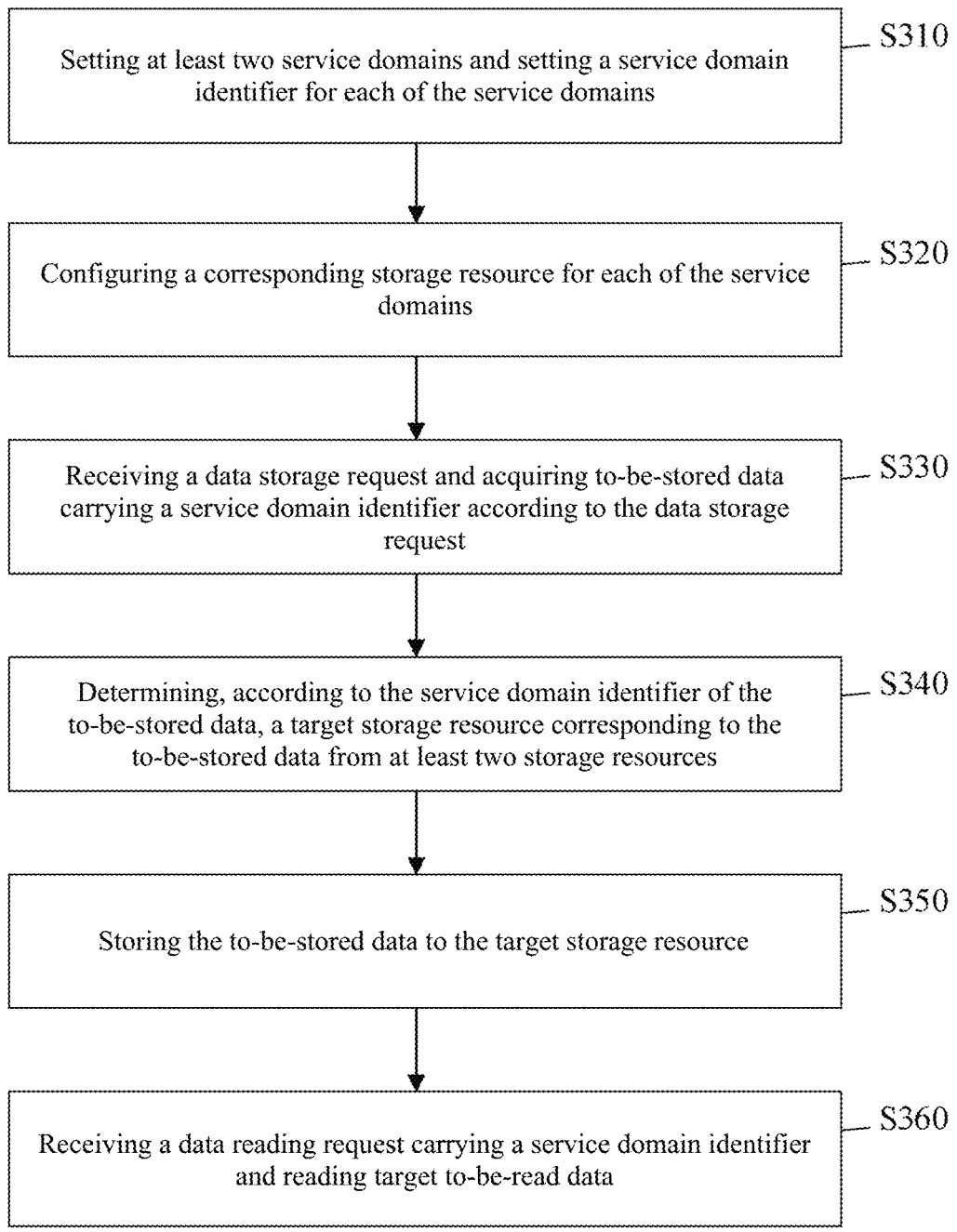
FIG. 3 is a flowchart of another data storage method according to an embodiment of the specification.

As shown in FIG. 3, a data storage method includes step S310 to step S360.

In step S310, the method includes setting at least two service domains and setting a service domain identifier for each of the service domains.

The service domain may be the scope of a service. Different service lines may correspond to same or different service domains, depending on actual situations. One service line may include several services (subservices) having at least one common attribute feature. Different services of the same service line belong to the same service domain. The service domain identifier is a type of tag information representing characteristics or features of a service domain. The service domain identifier may be set for the service domain according to feature information such as the type of the service domain.

For example, "pay", "collect" and "transfer", which involve transactions of account funds and have the same attribute feature, are different services of the same service line and belong to the same service domain. Likewise, "ride-sharing driver-side automatic order-receiving" and "ride-sharing client-side pickup request", which both fall within the scope of a ride-sharing service and have the same attribute feature, are different services of the same service line and belong to the same service domain. The rest can be deduced by analogy, and the details will not be described herein.

For example, it is assumed that one application system includes two different service lines: one including living payment services such as "paying water bill", "paying electricity bill", and "paying gas bill"; and the other including public transportation services such as "transport code" and "scan a bicycle". In this case, the two service lines are of different service types. A corresponding service domain may be set for each of the two service lines, and service domain identifiers "living payment" and "public transportation" may be respectively set for the two service domains.

In a case that service types of different service lines are similar, a service domain may be directly set for each of the service lines. Alternatively, depending on specific situations, the service types of the different service lines are classified, and it is determined whether two or more service types can be considered to be a same type. If it is determined that the two or more service types can be considered to be a same service type, a same service domain is set for the two or more service types, and a service domain identifier is set for the service domain. If it is determined that the two or more service types cannot be considered to be a same service type, service domains are respectively set for the two or more service types, and a service domain identifier is set for each service domain, which is not limited in the specification.

For example, it is assumed that one application system includes two service lines: one including living payment services such as "paying water bill", "paying electricity bill" and "paying gas bill"; and the other including top up services such as "mobile top up", "broadband top up" and "data top up". Service types of the two service lines are "payment" and "top up", which may be classified as the same or different service types, specifically depending on actual requirements. A service domain may be directly set for each of the two service lines "payment" and "top up". Alternatively, the types of the two service lines may be classified first. In a case that "payment" and "top up" are considered to be the same service type, a same service domain is set for the two service lines, and a service domain identifier "payment top up" is set for the service domain. In a case that "payment" and "top up" are considered to be different service types, service domains are respectively set for the two service lines, and service domain identifiers "payment" and "top up" are respectively set for the two service domains.

In an embodiment of the specification, service domains may be set according to differences between the service types of the service lines, or service domains may be set according to differences between operation and maintenance requirements or SLAs of the service lines, which depends on actual situations and is not limited in the specification.

For example, it is assumed that one application system includes five service lines of different service types, namely, service line A, service line B, service line C, service line D and service line E. The service line A has no special requirement on operation and maintenance and SLA, and a default service domain is set for the service line A. The service line B has a special requirement on operation and maintenance and has no special requirement on SLA, and a service domain $Y_b$ is set for the service line B. The service line C has no special requirement on operation and maintenance and has a special requirement on SLA, and a service domain $Y_c$ is set for the service line C. The service line D and the service line E have special requirements on operation and maintenance and on SLA. In a case that the service line D and the service line E have the same operation and maintenance requirement and different SLAs, or have different operation and maintenance requirements and the same SLA, or have different operation and maintenance requirements and different SLAs, a service domain $Y_d$ and a service domain $Y_e$ are respectively set for the service line D and the service line E. In a case that the service line D and the service line E have the same operation and maintenance requirement and the same SLA, a same service domain $Y_{de}$ is set for the service line D and the service line E. The rest can be deduced by analogy, and the details will not be described herein.

In step S320, the method includes configuring a corresponding storage resource for each of the service domains.

In practical applications, a corresponding storage resource may be configured for each of the service domains based on parameter information of the service domain.

The parameter information of the service domain may be various information such as data specification information, operation and maintenance requirement information, or SLA information, depending on actual situations, which is not limited in the specification. The storage resource may be various databases, database servers or database systems, such as a relational database management system (MySql), a distributed storage system (HBase), a high-performance distributed database system (OceanBase) supporting massive data, or a non-relational database (NoSql), which depends on the specific situations and is not limited in the specification.

In step S330, the method includes receiving a data storage request and acquiring to-be-stored data carrying a service domain identifier according to the data storage request.

Reference may be made to the foregoing embodiments for details, which will not be repeatedly described here.

In step S340, the method includes determining, according to the service domain identifier of the to-be-stored data, a target storage resource corresponding to the to-be-stored data from at least two storage resources.

In practical applications, according to the service domain identifier of the to-be-stored data, a service domain having the service domain identifier of the to-be-stored data may be determined as a target service domain, and a storage resource corresponding to the target service domain may be determined as the target storage resource according to the target service domain.

Specifically, the target service domain may be a service domain to which the to-be-stored data belongs, and the target storage resource may be a storage resource corresponding to the target service domain and set for the target service domain.

For example, assuming that the service domain identifier of the acquired to-be-stored data is "living payment", the service domain "living payment" is determined as the target service domain, and a storage resource corresponding to the service domain "living payment" is determined as the target storage resource.

In step S350, the method includes storing the to-be-stored data to the target storage resource.

Reference may be made to the foregoing embodiments for details, which will not be repeatedly described here.

In step S360, the method includes receiving a data reading request carrying a service domain identifier and reading target to-be-read data.

In practical applications, a target to-be-read service domain corresponding to the target to-be-read data may be determined based on the service domain identifier; a target to-be-read storage resource may be determined based on the target to-be-read service domain; and the target to-be-read data may be read from the target to-be-read storage resource.

Specifically, the data reading request may carry one service domain identifier, or may carry a plurality of different service domain identifiers. In other words, the data reading request may be sent for stored data of a single type and a single service domain, or may be sent for stored data of a plurality of different types and different service domains, which depends on specific situations and is not limited in the specification.

In a case that the data reading request carries only one service domain identifier, the service domain to which the target to-be-read data belongs may be determined based on the service domain identifier, a corresponding storage resource may be determined as the target to-be-read storage resource according to the service domain to which the target to-be-read data belongs, and the target to-be-read data may be read from the target to-be-read storage resource.

In a case that the data reading request carries two or more service domain identifiers, a service domain corresponding to each data reading request may be respectively determined based on the two or more service domain identifiers, a storage resource corresponding to each service domain may be determined as the target to-be-read storage resource, and corresponding target to-be-read data may be read from each target to-be-read storage resource.

In the data storage method according to an embodiment of the specification, different service domains are defined for different service lines, and corresponding storage resources are set for different service domains respectively. In this way, effective isolation of data storage is achieved, stored data of different service lines do not interfere with each other, and the personalized configuration of storage resources is achieved, thereby satisfying the storage requirements of various different services. In addition, the rapid access to the stored data can also be achieved, thereby improving the stability of the system and services.

Figure 4:
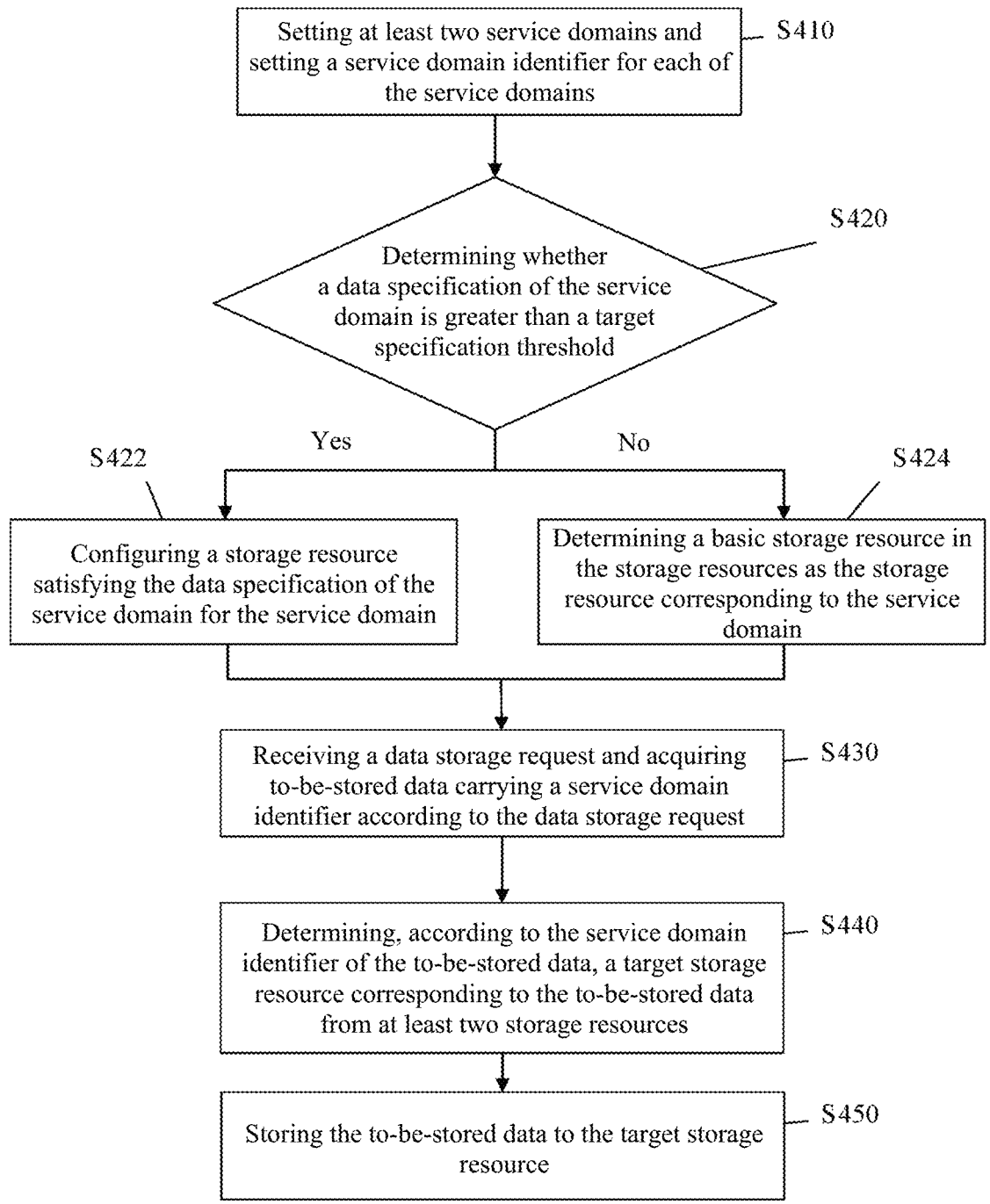
FIG. 4 is a flowchart of yet another data storage method according to an embodiment of the specification.

As shown in FIG. 4, a data storage method includes step S410 to step S450.

In step S410, the method includes setting at least two service domains and setting a service domain identifier for each of the service domains.

Reference may be made to the foregoing embodiments for details, which will not be repeatedly described here.

In step S420, the method includes determining whether a data specification of the service domain is greater than a target specification threshold. If yes, perform step S422; if not, perform step S424.

In step S422, the method includes configuring a storage resource satisfying the data specification of the service domain for the service domain.

In step S424, the method includes determining a basic storage resource in the storage resources as the storage resource corresponding to the service domain.

Specifically, the number of storage resources is at least two, and at least one of the at least two storage resources is a basic storage resource. For a service domain having a small data specification, data in the service domain may be directly stored to the basic storage resource without needing to re-configure storage resources. For a service domain having a large data specification, a storage resource matching parameters such as the capacity size of the service domain may be configured for the service domain.

For example, it is assumed that one application includes three service domains, namely, service domain A, service domain B, and service domain C, and a preset target capacity specification threshold is xGB, where the data specification of the service domain A is aGB, the data specification of the service domain B is bGB, the data specification of the service domain C is cGB, and $c>x=a>b$. The data specification of the service domain A is equal to the preset target capacity specification threshold, and the basic storage resource in the storage resources is determined as a storage resource corresponding to the service domain A. The data specification of the service domain B is less than the preset target capacity specification threshold, and the basic storage resource in the storage resources is determined as a storage resource corresponding to the service domain B. The data specification of the service domain C is greater than the target capacity specification threshold, and a corresponding storage resource C is configured for the service domain C.

In step S430, the method includes receiving a data storage request and acquiring to-be-stored data carrying a service domain identifier according to the data storage request.

Reference may be made to the foregoing embodiments for details, which will not be repeatedly described here.

In step S440, the method includes determining, according to the service domain identifier of the to-be-stored data, a target storage resource corresponding to the to-be-stored data from at least two storage resources.

Reference may be made to the foregoing embodiments for details, which will not be repeatedly described here.

In step S450, the method includes storing the to-be-stored data to the target storage resource.

Reference may be made to the foregoing embodiments for details, which will not be repeatedly described here.

In the data storage method according to an embodiment of the specification, the values of the data specifications of the service domains are distinguished, corresponding storage resources are configured for the service domains based on the data specifications, a default service domain is set, and in a case that the data specification of a service domain is less than the target threshold, the default service domain is used as the target storage resource for storage, thereby effectively saving the storage space and maximize the utilization of storage resources.

Figure 5:
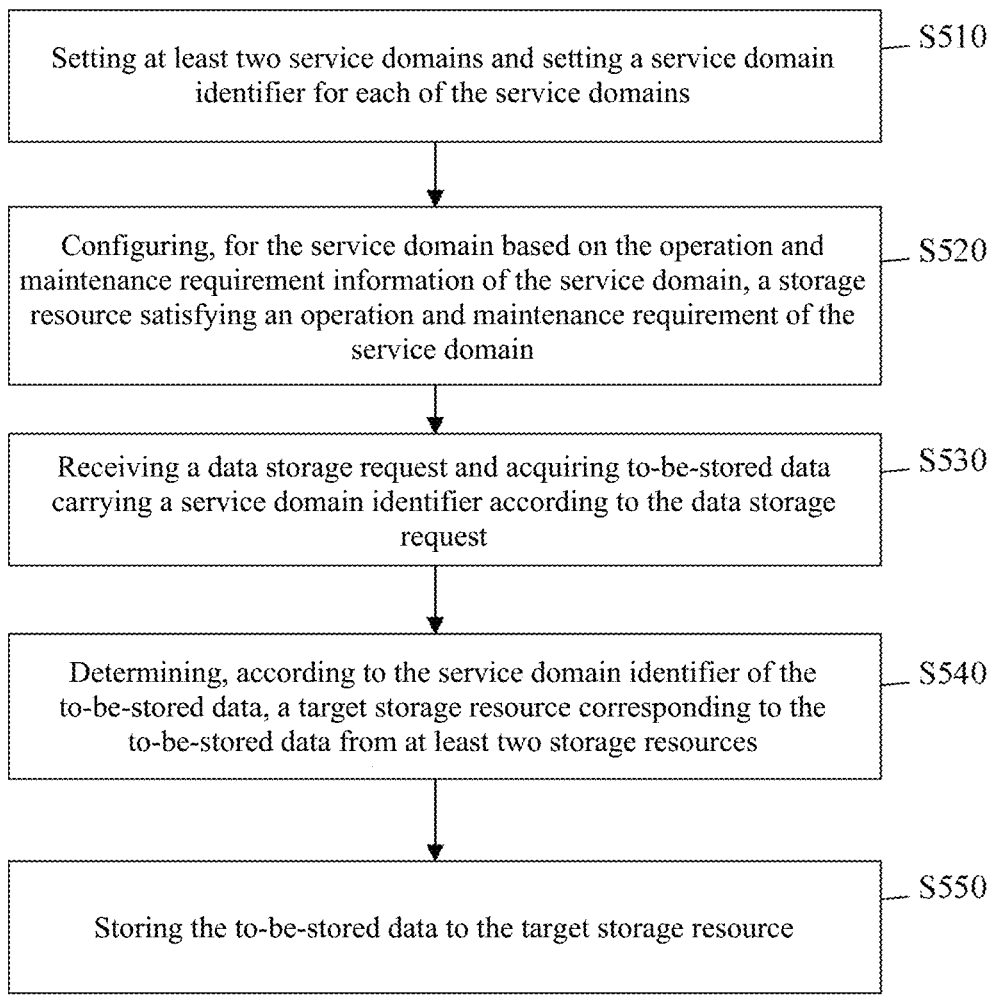
FIG. 5 is a flowchart of yet another data storage method according to an embodiment of the specification.

As shown in FIG. 5, a data storage method includes step S510 to step S550.

In step 510, the method includes setting at least two service domains and setting a service domain identifier for each of the service domains.

Reference may be made to the foregoing embodiments for details, which will not be repeatedly described here.

In step S520, the method includes configuring, for the service domain based on the operation and maintenance requirement information of the service domain, a storage resource satisfying an operation and maintenance requirement of the service domain.

In practical applications, a storage resource satisfying an operation and maintenance requirement of the service domain may be configured for the service domain based on the operation and maintenance requirement information of the service domain.

The operation and maintenance requirement may be all service requirements based on a virtualized network, such as operation and maintenance requirements of an operation and maintenance operation procedure in a communication network, policy-based fault self-healing, policy-based automatic elastic scaling, SLA or quality of service (QoS) and other automatic optimization. The operation and maintenance requirement information may be information about requirements of the foregoing operation and maintenance operations based on the service domain on storage resources.

Specifically, the number of storage resources is at least two, and at least one of the at least two storage resources is a basic storage resource. For a service domain having no special requirement on operation and maintenance, data in the service domain may be directly stored to the basic storage resource without needing to re-configure storage resources. For a service domain having a special requirement on operation and maintenance, a storage resource matching the operation and maintenance requirement of the service domain may be configured for the service domain.

In a case that the service domains are defined according to the operation and maintenance requirements of the service lines, a corresponding storage resource may be directly configured for each of the service domains. The basic storage resource may be used as a storage resource corresponding to the default service domain that has no special requirement on operation and maintenance and on SLA.

For example, according to different operation and maintenance requirements of service lines, three service domains, namely, service domain A, service domain B and a default service domain, are defined for three service lines in one application. Each of the service domains includes one service line. In this case, the basic storage resource is determined as a storage resource corresponding to the default service domain, and a storage resource A and a storage resource B satisfying operation and maintenance requirements of the service domain A and the service domain B are respectively configured for the service domain A and the service domain B.

In a case that the service domains are defined according to the service types or SLAs of the service lines, operation and maintenance requirement information of a service domain is read, and it is determined whether the service domain has a special requirement on operation and maintenance. If yes, a corresponding storage resource is configured for the service domain; if not, the basic storage resource in the storage resources is determined as a storage resource corresponding to the service domain. The rest can be deduced by analogy, and the details will not be described herein.

For example, it is assumed that according to different service types, three service domains, namely, service domain A, service domain B and service domain C, are defined for four service lines in one application. The service domain A includes two service lines. The service domain B and the service domain C each include one service line. The service domain A has no special requirement on operation and maintenance, and the basic storage resource is determined as a storage resource corresponding to the service domain A. The service domain B and the service domain C both have a special requirement on operation and maintenance. In a case that the service domain B and the service domain C have the same operation and maintenance requirement, a same storage resource is configured for the service domain B and the service domain C. In a case that the service domain B and the service domain C have different operation and maintenance requirements, corresponding storage resources are respectively configured for the service domain B and the service domain C.

In step S530, the method includes receiving a data storage request and acquiring to-be-stored data carrying a service domain identifier according to the data storage request.

Reference may be made to the foregoing embodiments for details, which will not be repeatedly described here.

In step S540, the method includes determining, according to the service domain identifier of the to-be-stored data, a target storage resource corresponding to the to-be-stored data from at least two storage resources.

Reference may be made to the foregoing embodiments for details, which will not be repeatedly described here.

In step S550, the method includes storing the to-be-stored data to the target storage resource.

Reference may be made to the foregoing embodiments for details, which will not be repeatedly described here.

In the data storage method according to an embodiment of the specification, a storage resource satisfying an operation and maintenance requirement of the service domain is configured for the service domain based on the operation and maintenance requirement information of the service domain, so that not only effective isolation of data storage can be achieved, but also the storage requirements of various types of services can be satisfied to achieve personalized storage.

Figure 6:
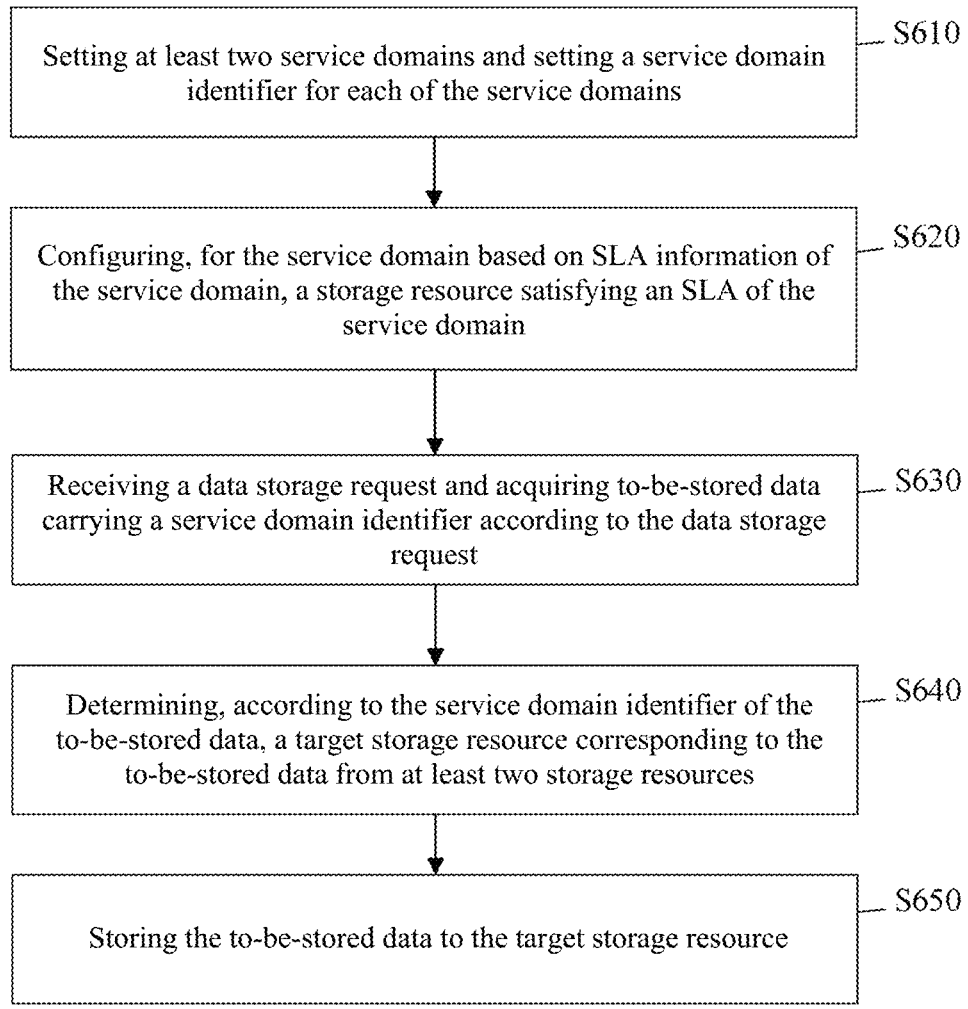
FIG. 6 is a flowchart of yet another data storage method according to an embodiment of the specification.

As shown in FIG. 6, a data storage method includes step S610 to step S650.

In step S610, the method includes setting at least two service domains and setting a service domain identifier for each of the service domains.

Reference may be made to the foregoing embodiments for details, which will not be repeatedly described here.

In step S620, the method includes configuring, for the service domain based on SLA information of the service domain, a storage resource satisfying an SLA of the service domain.

In practical applications, a storage resource satisfying an SLA of each subservice in the service domain may be configured for the service domain based on SLA information of each subservice in the service domain.

The SLA information may include requirement information such as data type of to-be-stored data, access mode, and access performance. Subservices in a service domain include every service of every service line in the service domain. For example, assuming that the service domain Y includes service line m and service line n, services $m_1$, $m_2$, $m_3$ ... of the service line m and services $n_1$, $n_2$, $n_3$ ... of the service line n are all subservices in the service domain.

Specifically, the number of storage resources is at least two, and at least one of the at least two storage resources is a basic storage resource. For a service domain having no special requirement on SLA, data in the service domain may be directly stored to the basic storage resource without needing to re-configure storage resources. For a service domain having a special requirement on SLA, a storage resource matching the SLA of the service domain may be configured for the service domain.

In a case that the service domains are defined according to the SLAs of the service domains, a corresponding storage resource may be directly configured for each of the service domains. A storage resource corresponding to the default service domain is the basic storage resource.

For example, it is assumed that according to different SLAs of service lines, two service domains, namely, a default service domain and the service domain A, are defined for five service lines in one application. The default service domain includes three service lines, and the service domain A includes two service lines. In this case, the basic storage resource is determined as the storage resource corresponding to the default service domain, and a storage resource A satisfying an SLA of the service domain A is configured for the service domain A.

In a case that the service domains are defined according to the service types or operation and maintenance requirements of the service lines, an SLA of each subservice in a service domain is read, and it is determined whether the service domain has a special requirement on SLA. If yes, a corresponding storage resource is configured for the service domain; if not, the basic storage resource in the storage resources is determined as a storage resource corresponding to the service domain.

It is assumed that according to different service types, three service domains, namely, service domain A, service domain B and service domain C, are defined for four service lines in one application. The service domain A includes two service lines. The service domain B and the service domain C each include one service line. The service domain A has no special requirement on SLA, and the basic storage resource is determined as a storage resource corresponding to the service domain A. The service domain B and the service domain C both have a special requirement on SLA. In a case that the service domain B and the service domain C have the same SLA, a same storage resource is configured for the service domain B and the service domain C. In a case that the service domain B and the service domain C have different SLAs, corresponding storage resources are respectively configured for the service domain B and the service domain C.

In step S630, the method includes receiving a data storage request and acquiring to-be-stored data carrying a service domain identifier according to the data storage request.

Reference may be made to the foregoing embodiments for details, which will not be repeatedly described here.

In step S640, the method includes determining, according to the service domain identifier of the to-be-stored data, a target storage resource corresponding to the to-be-stored data from at least two storage resources.

Reference may be made to the foregoing embodiments for details, which will not be repeatedly described here.

In step S650, the method includes storing the to-be-stored data to the target storage resource.

Reference may be made to the foregoing embodiments for details, which will not be repeatedly described here.

In the data storage method according to an embodiment of the specification, based on an SLA information of each subservice in a service domain, a storage resource satisfying the SLA of each subservice in the service domain is configured for the service domain, thereby achieving the personalized configuration of storage resources and satisfying the storage requirements of various complex services.

Figure 7:
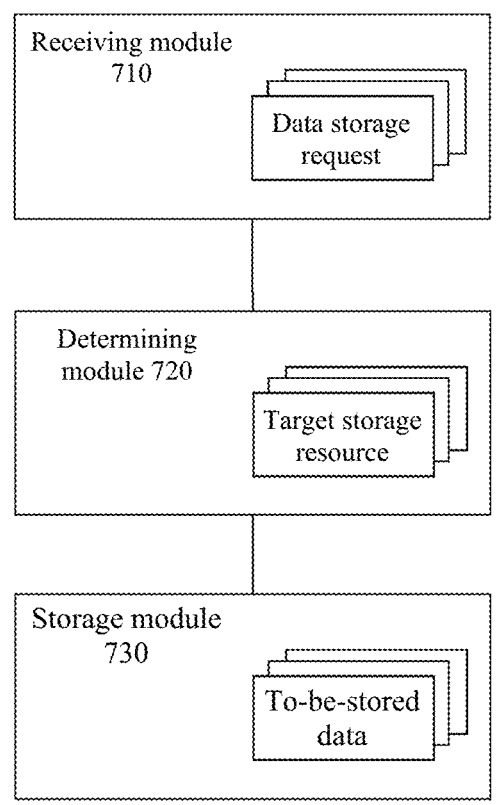
FIG. 7 is a block diagram of a data storage apparatus according to an embodiment of the specification.

As shown in FIG. 7, a data storage apparatus includes: a receiving module 710, a determining module 720, and a storage module 730.

The receiving module 710 is configured to receive a data storage request and acquire to-be-stored data carrying a service domain identifier according to the data storage request;

The determining module 720 is configured to determine, according to the service domain identifier of the to-be-stored data, a target storage resource corresponding to the to-be-stored data from at least two storage resources; and The storage module 730 is configured to store the to-be-stored data to the target storage resource.

In some embodiments, the data storage apparatus further includes: a setting module, configured to set at least two service domains and setting a service domain identifier for each of the service domains; and a configuration module, configured to configure a corresponding storage resource for each of the service domains.

In some embodiments, the configuration module is further configured to: configure a corresponding storage resource for each of the service domains based on parameter information of the service domain.

In some embodiments, the parameter information of the service domain includes data specification information, and the configuration module is further configured to: determine whether a data specification of the service domain is greater than a target specification threshold; configure a storage resource satisfying the data specification of the service domain for the service domain in a case that the data specification of the service domain is greater than the target specification threshold; and determine a basic storage resource in the storage resources as the storage resource corresponding to the service domain in a case that the data specification of the service domain is less than or equal to the target specification threshold.

In some embodiments, the parameter information of the service domain includes operation and maintenance requirement information, and the configuration module is further configured to: configure, for the service domain based on the operation and maintenance requirement information of the service domain, a storage resource satisfying an operation and maintenance requirement of the service domain.

In some embodiments, the parameter information of the service domain includes SLA information, and the configuration module is further configured to: configure, for the service domain based on SLA information of each subservice in the service domain, a storage resource satisfying an SLA of each subservice in the service domain.

In some embodiments, the determining module 720 is further configured to: determine, according to the service domain identifier of the to-be-stored data, a service domain having the service domain identifier of the to-be-stored data as a target service domain; and determine, according to the target service domain, a storage resource corresponding to the target service domain as the target storage resource.

In some embodiments, the data storage apparatus further includes: a reading module, configured to receive a data reading request carrying a service domain identifier and read target to-be-read data.

In some embodiments, the reading module is further configured to: determine a target to-be-read service domain corresponding to the target to-be-read data based on the service domain identifier; determine a target to-be-read storage resource based on the target to-be-read service domain; and read the target to-be-read data from the target to-be-read storage resource.

The data storage apparatus according to an embodiment of the specification can define service domains for different service lines and configure storage resources in a personalized manner, thereby improving the stability, isolation and scalability of the system and services, enhancing enhance the flexibility of deployment, operation and maintenance of storage resources, and satisfying the storage requirements of various complex services.

An embodiment of the specification further provides a computing device, including a memory, a processor, and computer instructions stored in the memory and executable by the processor, the processor executing the instructions to implement the following steps: receiving a data storage request and acquiring to-be-stored data carrying a service domain identifier according to the data storage request; determining, according to the service domain identifier of the to-be-stored data, a target storage resource corresponding to the to-be-stored data from at least two storage resources; and storing the to-be-stored data to the target storage resource.

An embodiment of the specification further provides a computer readable storage medium storing computer instructions, the instructions, when executed by a processor, implementing the steps of the foregoing data storage method.

The foregoing is a schematic solution of a computer readable storage medium of this embodiment. It should be noted that the technical solution of the storage medium belongs to the same concept as the technical solution of the foregoing data storage method. For details not set forth in the technical solution of the storage medium, reference may be made to the description of the technical solution of the foregoing data storage method.

The computer instructions include computer program code, which may be in the form of a source code, in the form of an object code, in the form of an executable file or in some intermediate form, etc. The computer readable medium may include any entity or device capable of carrying the computer program code, a recording medium, a USB flash drive, a removable hard disk, a magnetic disk, an optical disc, a computer memory, a Read-Only Memory (ROM), a Random Access Memory (RAM), electrical carrier signals, telecommunications signals, a software distribution medium, etc. It should be noted that the content contained in the computer readable medium may be appropriately increased or decreased according to the requirements of legislation and patent practice in the jurisdictions. For example, in some jurisdictions, according to legislation and patent practice, a computer readable medium excludes electric carrier signals and telecommunication signals.

It should be noted that, for brief description, the foregoing method embodiments are represented as a series of actions. However, persons skilled in the art should appreciate that the specification is not limited to the described order of the actions, because according to the specification, some steps may be performed in other orders or simultaneously. It should be further appreciated by persons skilled in the art that the embodiments described in this specification all belong to preferred embodiments, and the actions and modules are not necessarily required by the specification.

In the foregoing embodiments, the description of each embodiment has respective focuses. For a part that is not described in detail in an embodiment, reference may be made to related descriptions in other embodiments.

The preferred embodiments of the specification disclosed above are only used to help explain the specification. The optional embodiments do not describe all the details, and are not intended to limit the specification to the specific implementations described. Obviously, many modifications and changes may be made according to the content of this specification. These embodiments are selected and described in this specification for better explaining the principles and practical applications of the specification, so that those skilled in the art can better understand and use the specification. The specification is limited only by the claims and full scope and equivalents thereof.

What is claimed is:

1. A data storage method, comprising:
    setting, by a computer, at least two service domains each having a service domain identifier;
    configuring, by the computer based on parameter information of each of the at least two service domains, at least two storage resources corresponding to the at least two service domains;
    receiving, by the computer, a data storage request including identification information for to-be-stored data, wherein the to-be-stored data carries a first service domain identifier of the service domain identifiers of the at least two service domains;
    acquiring, by the computer based on the identification information for the to-be-stored data, the to-be-stored data, and obtaining the first service domain identifier carried by the to-be-stored data;
    determining, by the computer according to the first service domain identifier of the to-be-stored data, a target storage resource corresponding to the to-be-stored data from the at least two storage resources;
    storing, by the computer, the to-be-stored data to the target storage resource;
    receiving, by the computer, a data reading request carrying the first service domain identifier;
    in response to receiving the data reading request, reading, by the computer based on the first service domain identifier, the data stored at the target storage resource; and
    transmitting, by the computer, the data read from the target storage resource to a requester that sends the data reading request.

2. The method according to claim 1, wherein the parameter information of each of the at least two service domains comprises a data specification for one of the at least two service domains, and the configuring, by the computer based on parameter information of each of the at least two service domains, at least two storage resources corresponding to the at least two service domains comprises:
    determining whether the data specification for the one of the at least two service domains is greater than a specification threshold; and
    in response to determining that the data specification for the one of the at least two service domains is greater than the specification threshold, configuring a storage resource satisfying the data specification for the one of the at least two service domains; or
    in response to determining that the data specification for the one of the at least two service domains is less than or equal to the specification threshold, determining a basic storage resource in the storage resources as a storage resource for the one of the at least two service domains.

3. The method according to claim 1, wherein the parameter information of each of the at least two service domains comprises operation and maintenance requirement information, and the configuring, by the computer based on parameter information of each of the at least two service domains, at least two storage resources corresponding to the at least two service domains comprises:
    configuring, based on the operation and maintenance requirement information of each of the at least two service domains, a storage resource satisfying the operation and maintenance requirement information for each of the at least two service domains.

4. The method according to claim 1, wherein the parameter information of each of the at least two service domains comprises service-level agreement (SLA) information, and the configuring, by the computer based on parameter information of each of the at least two service domains, at least two storage resources corresponding to the at least two service domains comprises:
    configuring, based on the SLA information of each subservice in each of the at least two service domains, a storage resource satisfying the SLA information of the each subservice in each of the at least two service domains.

5. The method according to claim 1, wherein the determining, by the computer according to the first service domain identifier of the to-be-stored data, a target storage resource corresponding to the to-be-stored data from the at least two storage resources comprises:
    determining, according to the first service domain identifier of the to-be-stored data, a service domain having the first service domain identifier of the to-be-stored data as a target service domain; and
    determining, according to the target service domain, a storage resource corresponding to the target service domain as the target storage resource.

6. The method according to claim 1, wherein the at least two storage resources comprise:
    a relational database management system, a distributed storage system, a high-performance distributed database system, or a non-relational database.

7. The method according to claim 1, further comprising:
formatting, by the computer, the to-be-stored data based on a format of target storage resource to store the to-be-stored data to the target storage resource.

8. An apparatus, comprising:
one or more processors; and
a memory storing instructions executable by the one or more processors to cause the one or more processors to perform operations comprising:
setting at least two service domains each having a service domain identifier;
configuring, based on parameter information of each of the at least two service domains, at least two storage resources corresponding to the at least two service domains;
receiving a data storage request including identification information for to-be-stored data, wherein the to-be-stored data carries a first service domain identifier of the service domain identifiers of the at least two service domains;
acquiring, based on the identification information for the to-be-stored data, the to-be-stored data, and obtaining the first service domain identifier carried by the to-be-stored data;
determining, according to the first service domain identifier of the to-be-stored data, a target storage resource corresponding to the to-be-stored data from the at least two storage resources;
storing the to-be-stored data to the target storage resource;
receiving a data reading request carrying the first service domain identifier;
in response to receiving the data reading request, reading, based on the first service domain identifier, the data stored at the target storage resource; and
transmitting the data read from the target storage resource to a requester that sends the data reading request.

9. The apparatus according to claim 8, wherein the parameter information of each of the at least two service domains comprises a data specification for one of the at least two service domains, and the configuring, based on parameter information of each of the at least two service domains, at least two storage resources corresponding to the at least two service domains comprises:
determining whether the data specification for the one of the at least two service domains is greater than a specification threshold; and
in response to determining that the data specification for the one of the at least two service domains is greater than the specification threshold, configuring a storage resource satisfying the data specification for the one of the at least two service domains; or
in response to determining that the data specification for the one of the at least two service domains is less than or equal to the specification threshold, determining a basic storage resource in the storage resources as a storage resource for the one of the at least two service domains.

10. The apparatus according to claim 8, wherein the parameter information of each of the at least two service domains comprises operation and maintenance requirement information, and the configuring, based on parameter information of each of the at least two service domains, at least two storage resources corresponding to the at least two service domains comprises:
configuring, based on the operation and maintenance requirement information of each of the at least two service domains, a storage resource satisfying the operation and maintenance requirement information for each of the at least two service domains.

11. The apparatus according to claim 8, wherein the parameter information of each of the at least two service domains comprises service-level agreement (SLA) information, and the configuring, based on parameter information of each of the at least two service domains, at least two storage resources corresponding to the at least two service domains comprises:
configuring, based on the SLA information of each sub-service in each of the at least two service domains, a storage resource satisfying the SLA information of the each subservice in each of the at least two service domains.

12. The apparatus according to claim 8, wherein the determining, according to the first service domain identifier of the to-be-stored data, a target storage resource corresponding to the to-be-stored data from the at least two storage resources comprises:
determining, according to the first service domain identifier of the to-be-stored data, a service domain having the first service domain identifier of the to-be-stored data as a target service domain; and
determining, according to the target service domain, a storage resource corresponding to the target service domain as the target storage resource.

13. The apparatus according to claim 8, wherein the at least two storage resources comprise:
a relational database management system, a distributed storage system, a high-performance distributed database system, or a non-relational database.

14. The apparatus according to claim 8, wherein the operations further comprise:
formatting, by the computer, the to-be-stored data based on a format of target storage resource to store the to-be-stored data to the target storage resource.

15. One or more non-transitory computer-readable storage media configured with instructions executable by one or more processors to cause the one or more processors to perform operations comprising:
setting at least two service domains each having a service domain identifier;
configuring, based on parameter information of each of the at least two service domains, at least two storage resources corresponding to the at least two service domains;
receiving a data storage request including identification information for to-be-stored data, wherein the to-be-stored data carries a first service domain identifier of the service domain identifiers of the at least two service domains;
acquiring, based on the identification information for the to-be-stored data, the to-be-stored data, and obtaining the first service domain identifier carried by the to-be-stored data;
determining, according to the first service domain identifier of the to-be-stored data, a target storage resource corresponding to the to-be-stored data from the at least two storage resources;
storing the to-be-stored data to the target storage resource;
receiving a data reading request carrying the first service domain identifier;
in response to receiving the data reading request, reading, based on the first service domain identifier, the data stored at the target storage resource; and
transmitting the data read from the target storage resource to a requester that sends the data reading request.

16. The one or more non-transitory computer-readable storage media according to claim 15, wherein the parameter information of each of the at least two service domains comprises a data specification for one of the at least two service domains, and the configuring, based on parameter information of each of the at least two service domains, at least two storage resources corresponding to the at least two service domains comprises:
- determining whether the data specification for the one of the at least two service domains is greater than a specification threshold; and
- in response to determining that the data specification for the one of the at least two service domains is greater than the specification threshold, configuring a storage resource satisfying the data specification for the one of the at least two service domains; or
- in response to determining that the data specification for the one of the at least two service domains is less than or equal to the specification threshold, determining a basic storage resource in the storage resources as a storage resource for the one of the at least two service domains.

17. The one or more non-transitory computer-readable storage media according to claim 15, wherein the parameter information of each of the at least two service domains comprises operation and maintenance requirement information, and the configuring, based on parameter information of each of the at least two service domains, at least two storage resources corresponding to the at least two service domains comprises:
- configuring, based on the operation and maintenance requirement information of each of the at least two service domains, a storage resource satisfying the operation and maintenance requirement information for each of the at least two service domains.

18. The one or more non-transitory computer-readable storage media according to claim 15, wherein the parameter information of each of the at least two service domains comprises service-level agreement (SLA) information, and the configuring, based on parameter information of each of the at least two service domains, at least two storage resources corresponding to the at least two service domains comprises:
- configuring, based on the SLA information of each subservice in each of the at least two service domains, a storage resource satisfying the SLA information of the each subservice in each of the at least two service domains.

19. The one or more non-transitory computer-readable storage media according to claim 15, wherein the determining, according to the first service domain identifier of the to-be-stored data, a target storage resource corresponding to the to-be-stored data from the at least two storage resources comprises:
- determining, according to the first service domain identifier of the to-be-stored data, a service domain having the first service domain identifier of the to-be-stored data as a target service domain; and
- determining, according to the target service domain, a storage resource corresponding to the target service domain as the target storage resource.

20. The one or more non-transitory computer-readable storage media according to claim 15, wherein the at least two storage resources comprise:
- a relational database management system, a distributed storage system, a high-performance distributed database system, or a non-relational database.

* * * * *